May 17, 1960   S. R. SMITH, JR   2,937,253
ELECTRIC FUSE MOUNTING AND CONNECTION
Filed Jan. 15, 1958
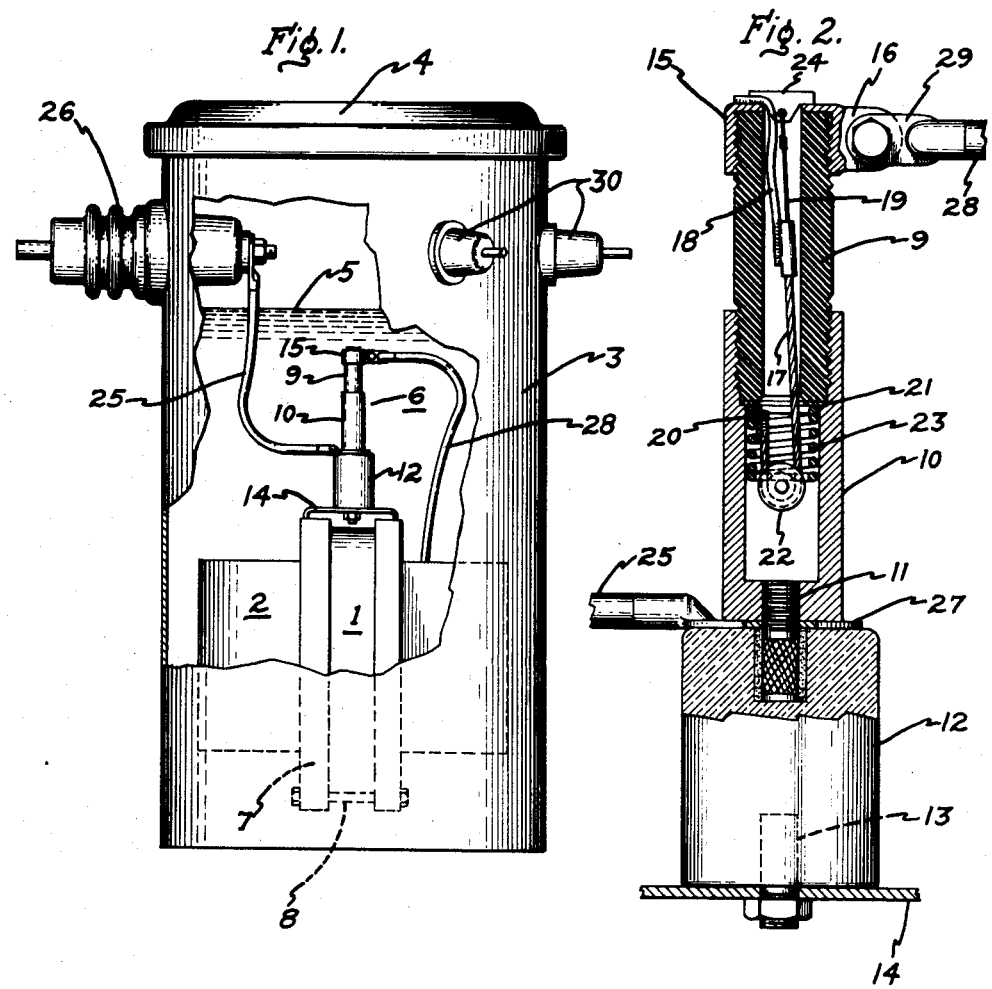
Inventor
Sidney R. Smith, Jr.
by Gilbert P. Tarleton
His Attorney.

United States Patent Office 2,937,253
Patented May 17, 1960

2,937,253

ELECTRIC FUSE MOUNTING AND CONNECTION

Sidney R. Smith, Jr., Stockbridge, Mass., assignor to General Electric Company, a corporation of New York Application January 15, 1958, Serial No. 709,096

5 Claims. (Cl. 200—113)

This invention relates to an electric fuse, and more particularly, to an improved mounting and connection of an electric fuse in an electrical apparatus.

Electrical apparatus such as a transformer is usually housed in a metallic tank. Primary fuses are frequently used inside the tank to protect against overcurrents in the transformer. By a primary fuse is meant one which is used in the primary side or incoming supply line of the apparatus. The primary side in pole type transformers is usually the high voltage side of the apparatus since pole type transformers conventionally are used to step down the voltage. At high overcurrents it is not infrequent for these fuses to be forcibly blown off their mounting or for the leads to the fuse to be whipped about inside the tank, causing power arcs to be established to the metallic tank walls and resulting in shortcircuiting the high voltage supply line. This is not only apt to do damage to the apparatus and to create a personnel hazard to persons nearby, but also prevents the fuse from accomplishing its intended purpose, namely, to electrically isolate the faulty apparatus from the supply line. The failure of the fuse to do the latter tends to trip out the entire feeder, or branch circuit, to which the apparatus is connected. This may result in costly loss of power to all apparatus on the feeder. Such unnecessary outages are very undesirable to both the utility supplying the power and to the power consumer.

Additionally, some transformer liquid immersed fuses have recoil force reactions when they interrupt high currents such as to cause an upward thrust on the enclosing tank tending to dislodge the tank from its mounting. For instance, pole type transformers may be mounted on the cross arms of line poles by hooks which pass over the cross arm. In such a support an upward thrust on the tank will unhook it permitting it to fall to the ground.

I have discovered that the above discussed disadvantages and their attendant hazards can be greatly minimized by employing a particular combination of fuse mounting and connection to the supply circuit.

It is an object of this invention to provide an improved fuse mounting and fuse connection in electrical apparatus which will overcome the above discussed disadvantages of the prior art.

In my invention an expulsion fuse is used which is vented at one end. It is placed inside the housing of an electrical apparatus and securely anchored at its closed end. The incoming line for the apparatus is connected to the fuse at its anchored end, and the lead from the apparatus is connected to the fuse at its vented end.

The subject matter which I regard as my invention is particularly pointed out and distinctly claimed in the concluding portion of this specification. My invention, however, both as to organization and method of operation, together with further objects and advantages thereof, may best be understood by reference to the following description in connection with the accompanying drawing in which Fig. 1 is a partly broken away elevation view of one form of my invention, and Fig. 2 is an enlarged and detailed elevation view of the fuse of Fig. 1.

Referring now particularly to Fig. 1, illustrated therein is a housed transformer. The transformer comprises a magnetic core 1 and electrical windings 2 which are linked with the core 1 and provide not shown primary and secondary electrical winding sections or coils as is well known in the art.

The core 1 and windings 2 are positioned in a metallic tank 3 which is sealed closed by a metallic cover 4. The tank is filled with an electrical insulating and cooling liquid 5. The tank is filled with the liquid 5 to a high enough level to cover the core and windings as well as a fuse 6. The fuse 6 is immersed in the liquid so that the liquid can be used to aid in interrupting the fuse arc. However, the invention is not restricted to liquid filled electrical apparatus, but can be used in gas filled apparatus and apparatus which is vented to the atmosphere.

Magnetic cores are conventionally provided with core clamping means such as core braces 7 and means such as bolts 8 with nuts for drawing the braces 7 against the core. In the illustrated form of my invention the fuse is placed in an upright position on the core and is securely anchored at its lower end, which is the closed end, to the core clamping means. It is also essential that the supply, or line lead, from the high voltage bushing be attached to the anchored end of the fuse as will be explained in detail hereinafter.

Referring now also to Fig. 2, the fuse is an expulsion type which is vented or open at its upper end. It comprises a tubular member 9 which is constructed from electrical insulating material and is adapted to generate electrical arc extinguishing gases as is well known in the art. Additional arc extinguishing gases result from vaporization of the liquid which fills the tubular member 9. It is closed at its lower end by an elongated metallic cap or equivalent means 10 which serves as the lower terminal for the fuse.

The cap 10 will screw on a stud 11 which is fixed in the upper part of an electrical insulator 12. The lower part of the insulator is connected by a stud 13 and its nut to a support member 14. The support member 14 can be connected to the core braces 7 by welding or other appropriate means. In this manner the closed end of the fuse is firmly anchored to the magnetic core. The forces of recoil imposed on the fuse will not tear it off its mounting as in a cantilever type insulator mounting since the recoil forces move the fuse toward its anchor point and not away from it. That is, the fuse can withstand higher recoil forces since its support insulator 12 is subjected to forces which are primarily compressive. For instance, the insulator 12 might be made from porcelain electrical insulating material. Porcelain is considerably stronger in compression than tension. Therefore, if the fuse is recoiled toward rather than away from the insulator 12 the fuse can have higher recoil forces imposed on it.

Since the fuse is oriented with its closed end pointing downward the direct recoil force exerted by the fuse when it operates is in a downward direction. This means that there is less tendency for the fuse to cause the transformer to jump upward and disengage itself from its mounting in the event it is supported by hooks or the like.

The upper open end of the tubular member 9 has a flanged metallic collar or equivalent means 15 thereon which serves the function of an upper fuse terminal. A tab 16 can be formed on collar 15 to facilitate connecting a lead thereto.

The fuse link of the fuse is spring loaded to get rapid separation of the melted ends of the fuse link. The fuse link comprises a flexible conductor 17 and a fusible portion consisting of a fusible conductor 18 and a parallel strain wire 19. The lower end of conductor 17 is connected to a tab 20 of a conducting washer 21 which is clamped between the lower end of tubular member 9 and a shoulder formed in the upper end of cap 10. The conductor 17 is then brought around a movable pulley 22. A spring 23 is positioned inside the cap 10 between the washer 21 and pulley 22, and when the conductor 17 is pulled up around the pulley the spring 23 is compressed.

The upper end of the conductor 17 is connected to an end of the parallel fusible conductor 18 and strain wire 19. The other end of the starin wire is connected to a shallow V or wedge shaped element 24. The height of element 24 is selected to be less than the diameter of the bore in tubular member 9 so that when it is rotated about 90 degrees left or right from its illustrated position it can be brought up through the tubular member 9 to compress the spring 23. However, it is wide enough to diametrically span the upper end edge of the tubular member 9 or the flange of its collar 15. In this manner the spring is retained in a compressed condition. The fusible conductor 18 can be connected by brazing or the like to the flange of collar 15 although it could also be connected to the element 24. It will be obvious that when the conductor 18 and strain wire 19 are melted the spring 23 is released to introduce a large gap between the separated ends of the melted fuse link. This results in elongation of the fuse arc. The fuse arc simultaneously generates high pressures inside the tubular member 9 which results in expulsion of gases and liquid out of the open end of the tubular member 9. This elongation of the arc and expulsion action cooperate to extinguish the fuse arc.

In my invention the incoming line lead 25, which is connected to a primary bushing 26 which in turn is connected to a not shown distribution line which energizes the transformer, is connected to the anchored end of the fuse. This can be accomplished by connecting a flattened and pierced terminal contact 27 to the lower end of lead 25 and clamping pierced contact 27 between cap 10 and insulator 12 after the stud 11 is inserted in the pierced contact 26. The primary winding lead 28 from the primary winding section or coil to the fuse is connected to the vented end of the fuse. This can be accomplished by connecting a terminal contact 29 to the outer end of the primary lead 28 and then clamping contact 29 to tab 16.

This mode of connection of the fuse in the primary side of the transformer has several advantages. Since the lead 25 is connected to the anchored end of the fuse there is practically no chance that it will be blown into contact with the tank in which event the line would be short circuited through the tank. For instance, if the lead 25 were connected to the upper end of the fuse there is a greater chance that it would be forcibly dislocated from the fuse and blown about and into contact with the tank, and this would be particularly true if the upper end of the fuse were not vented. For this reason the primary winding lead 28 instead of the incoming line lead 25 is connected to the unanchored end of the fuse. If the lead 28 is dislocated from the fuse and caused to contact the tank no short circuit of line current through the tank results.

When the fuse melts a stream of semi-conducting arc products is expelled out of the open end of the fuse and this may result in a power arc from the fuse to the tank, in this instance to the tank cover since the fuse is upright. If the lead 25 were connected to the open end of the fuse the electrical arc extinguishing gas generating member 9 would not be interposed in the path of the power arc to interrupt it. However, with the lead 25 connected to the anchored closed end of the fuse the power arc must pass from the lead 25 to the tank through the electrical arc extinguishing gas generating member which means that it will put out the power arc. That is, the arc interrupting member 9 is always available to interrupt overcurrents since it is always electrically in series with the line current.

In distribution transformers it is common to ground the tank 3. A power arc is undesirable under any conditions, but with the tank grounded the result is a short circuit of line current to ground through the grounded tank. The tank may be grounded in order to ground the other end of the primary winding. If the other end of the primary winding is not grounded but connected to another incoming line then the invention will be duplicated in said other incoming line in order to give complete protection to the transformer against overcurrents. However, even in such a case it is common to have a grounded tank for the purpose of grounding the midpoint of the secondary winding while its opposite ends are connected to the secondary bushings 30.

In my invention the fuse is placed in the upper part of liquid 5. This is because when it is placed deep down in the liquid there is a greater tendency for the fuse recoil reaction on the mass of liquid above it to cause the tank to jump. For this reason the fuse is placed relatively closer to the surface of the liquid than the bottom of the tank.

In the preferred form of my invention the fuse is in an upright position with its open end close to the liquid surface to minimize the effect of fuse recoil reaction on the mass of liquid above the fuse by relieving the fuse recoil reaction pressures in the mass of liquid into the gas space above the liquid surface. However, the fuse does not have to be absolutely vertical but could be tilted slightly providing the recoil from the fuse placed its support insulator primarily in compression and providing the degree of tilting did not cause the fuse recoil reaction to make the tank jump sideways. That is, if these conditions are met the fuse could be oriented with its open end relatively nearer the liquid surface than its closed end and this orientation need not necessarily be vertical.

While there has been shown and described a particular embodiment of the invention, it will be obvious to those skilled in the art that changes and modifications may be made without departing from the invention, and therefore, it is intended by the appended claims to cover all such changes and modifications as fall within the true spirit and scope of the invention.

What I claim as new and desire to secure by Letters Patent of the United States is:

1. In the combination of a housing and an electrical apparatus which is positioned in said housing, said apparatus being energized from a source of electrical energy through a generally upright expulsion fuse which is positioned in said housing, said fuse being vented at its upper end and closed and mounted on a support at its lower end, an electrical conductor connecting said electrical energy source to said closed fuse end, and another electrical conductor connecting said apparatus to said vented fuse end.

2. In the combination of a casing and an electrical apparatus which is enclosed in said casing, said apparatus being energized from a source of electrical energy through a generally upright expulsion fuse which is positioned in said casing, the upper end of said fuse being open and the lower end of said fuse being closed, said fuse being mounted on a support insulator at its lower end which is placed primarily in compression when said fuse recoils, an electrical lead connecting said source to said fuse adjacent its closed end, and another electrical lead connecting said apparatus to said fuse adjacent its open end.

3. In the combination of a liquid filled tank and an electrical apparatus which is immersed in the liquid in said tank, an expulsion type fuse positioned in said tank with its open end relatively nearer the liquid surface than its closed end and its open end relatively nearer the liquid surface than the tank bottom, said closed end being anchored to said apparatus by a support insulator, an electrical lead connecting said apparatus to the open end of said fuse and another electrical lead connected to the closed end of said fuse for energizing said apparatus.

4. In the combination of a housing and an electrical apparatus which is enclosed in said housing, a generally upright expulsion fuse in said housing, said fuse being open at its upper end and closed at its lower end, said fuse being mounted on a support insulator at its closed end for recoil of said expulsion fuse toward its support insulator whereby said insulator is placed primarily in compression when said fuse recoils, an electrical lead connecting said apparatus to said fuse adjacent said open end, another electrical lead connected to said fuse adjacent said closed end for energizing said apparatus, said apparatus and fuse being immersed in an electrical insulating liquid, and said fuse being positioned in the upper part of said liquid.

5. In the combination of a metal tank and an electrical apparatus which is housed in said tank, an expulsion fuse positioned in said tank, said fuse comprising an elongated fuseholder which is mounted in a generally upright position on an electrical insulator, the upper end of said fuseholder being open and the lower end being closed for recoil of said fuseholder toward said insulator whereby said insulator is placed primarily in compression when said fuseholder recoils, an insulating and cooling liquid in said tank and said apparatus and fuse submerged therein, an electrical lead connecting said apparatus and fuse adjacent said upper fuseholder end, another lead connected to said fuse adjacent said lower fuseholder end for connecting said apparatus to a source of electrical energy, and said fuseholder being positioned in the upper part of said liquid with said fuseholder upper end being positioned relatively close to the surface of said liquid.

References Cited in the file of this patent
UNITED STATES PATENTS

| | | |
|---|---|---|
| 816,443 | Eveleth | Mar. 27, 1906 |
| 2,223,232 | Smith | Nov. 26, 1940 |
| 2,223,726 | Hodnette | Dec. 3, 1940 |
| 2,281,073 | Leonard | Apr. 28, 1942 |
| 2,281,074 | Leonard | Apr. 28, 1942 |
| 2,314,346 | Craig | Mar. 23, 1943 |
| 2,319,276 | Triplett | May 18, 1943 |
| 2,326,031 | Hodnette et al. | Aug. 3, 1943 |
| 2,337,872 | Craig | Dec. 28, 1943 |
| 2,351,969 | Hurst | June 20, 1944 |
| 2,509,935 | Nelson | May 30, 1950 |
| 2,549,635 | Pittman | Apr. 17, 1951 |